US012783297B2

(12) United States Patent
Vergara

(10) Patent No.: US 12,783,297 B2
(45) Date of Patent: Nov. 3, 2026

(54) DYNAMIC ROUND ROBIN OPTIMIZED SCHEDULER TO IMPROVE PROCESSOR MEMORY UTILIZATION FOR LLMS USING FSDP

(71) Applicant: Lenovo Enterprise Solutions (Singapore) Pte. Ltd., New Tech Park (SG)

(72) Inventor: Manuel A. Vergara, Waxhaw, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 394 days.

(21) Appl. No.: 18/607,931

(22) Filed: Mar. 18, 2024

(65) Prior Publication Data

US 2025/0291629 A1 Sep. 18, 2025

(51) Int. Cl.
*G06F 9/48* (2006.01)
*G06F 40/20* (2020.01)

(52) U.S. Cl.
CPC ............ *G06F 9/4881* (2013.01); *G06F 40/20* (2020.01)

(58) Field of Classification Search
CPC .... G06F 9/4881; G06F 16/3329; G06F 40/20; G06F 40/284
See application file for complete search history.

(56) References Cited

U.S. PATENT DOCUMENTS

2025/0200083 A1* 6/2025 Madisetti ............ G06F 16/3329

OTHER PUBLICATIONS

Ott et al., "Fully Sharded Data Parallel: faster AI training with fewer GPUs", Engineering at Meta, https://engineering.fb.com/2021/07/15/open-source/fsdp/, Jul. 15, 2021, pp. 1-11.
Ghosh, "Optimizing RAG for LLMs Apps", Medium, https://medium.com/@bijit211987/optimizing-rag-for-llms-apps-53f6056d8118, Nov. 19, 2023, pp. 1-20.
Dickson, "The complete guide to LLM fine-tuning", TechTalks, https://bdtechtalks.com/2023/07/10/llm-fine-tuning/, Jul. 10, 2023, pp. 1-12.

* cited by examiner

*Primary Examiner* — Andy Ho
(74) *Attorney, Agent, or Firm* — Kunzler Needham & Hilton

(57) ABSTRACT

A method for using a round robin scheduler optimizer to improve processor memory utilization in an AI engine includes receiving, from a retrieval engine, a plurality of tokens identified as being related to key words from a user's query submitted to an artificial intelligence engine. The tokens are indexed to data segments stored by a large language model. The method includes placing, using a round robin scheduler optimizer, first tokens identified as most relevant to the user's query in a ready queue and placing, using the round robin scheduler optimizer, second tokens identified as less relevant to the user's query in a waiting queue, and using a fully shared data parallel engine to retrieve first data segments indexed to the first tokens into cache memory proximate to each other and to retrieve second data segments indexed to the second tokens into the cache memory proximate to the first data segments.

20 Claims, 7 Drawing Sheets

DYNAMIC ROUND ROBIN OPTIMIZED SCHEDULER TO IMPROVE PROCESSOR MEMORY UTILIZATION FOR LLMS USING FSDP

FIELD

The subject matter disclosed herein relates to artificial intelligence ("AI") engines and more particularly relates to a dynamic round robin scheduler optimizer to improve processor memory utilization for large language models using fully shared data parallel ("FSDP") in artificial intelligence ("AI") engines.

BACKGROUND

Large language models ("LLMs") for AI engines take vast amounts of processing time so methods for reducing processing time are desirable.

BRIEF SUMMARY

A method for using a round robin scheduler optimizer to improve processor memory utilization in an AI engine is disclosed. An apparatus and computer program product also perform the functions of the method. The method includes receiving, from a retrieval engine, a plurality of tokens identified as being related to key words from a user's query submitted to an artificial intelligence engine. The tokens are indexed to data segments stored by a LLM. The method includes placing, using a round robin scheduler optimizer, first tokens identified as most relevant to the user's query in a ready queue and placing, using the round robin scheduler optimizer, second tokens identified as less relevant to the user's query in a waiting queue, and using a fully shared data parallel ("FSDP") engine to retrieve first data segments indexed to the first tokens into cache memory proximate to each other and to retrieve second data segments indexed to the second tokens into the cache memory proximate to the first data segments.

An apparatus for using a round robin scheduler optimizer to improve processor memory utilization in an AI engine includes a processor and non-transitory computer readable storage media storing code. The code is executable by the processor to perform operations that include receiving, from a retrieval engine, a plurality of tokens identified as being related to key words from a user's query submitted to an artificial intelligence engine. The tokens are indexed to data segments stored by a LLM. The operations include placing, using a round robin scheduler optimizer, first tokens identified as most relevant to the user's query in a ready queue and placing, using the round robin scheduler optimizer, second tokens identified as less relevant to the user's query in a waiting queue, and using a FSDP engine to retrieve first data segments indexed to the first tokens into cache memory proximate to each other and to retrieve second data segments indexed to the second tokens into the cache memory proximate to the first data segments.

A program product for using a round robin scheduler optimizer to improve processor memory utilization in an AI engine includes a non-transitory computer readable storage medium storing code. The code is configured to be executable by a processor to perform operations that include receiving, from a retrieval engine, a plurality of tokens identified as being related to key words from a user's query submitted to an artificial intelligence engine. The tokens are indexed to data segments stored by a LLM. The operations include placing, using a round robin scheduler optimizer, first tokens identified as most relevant to the user's query in a ready queue and placing, using the round robin scheduler optimizer, second tokens identified as less relevant to the user's query in a waiting queue, and using a FSDP engine to retrieve first data segments indexed to the first tokens into cache memory proximate to each other and to retrieve second data segments indexed to the second tokens into the cache memory proximate to the first data segments.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
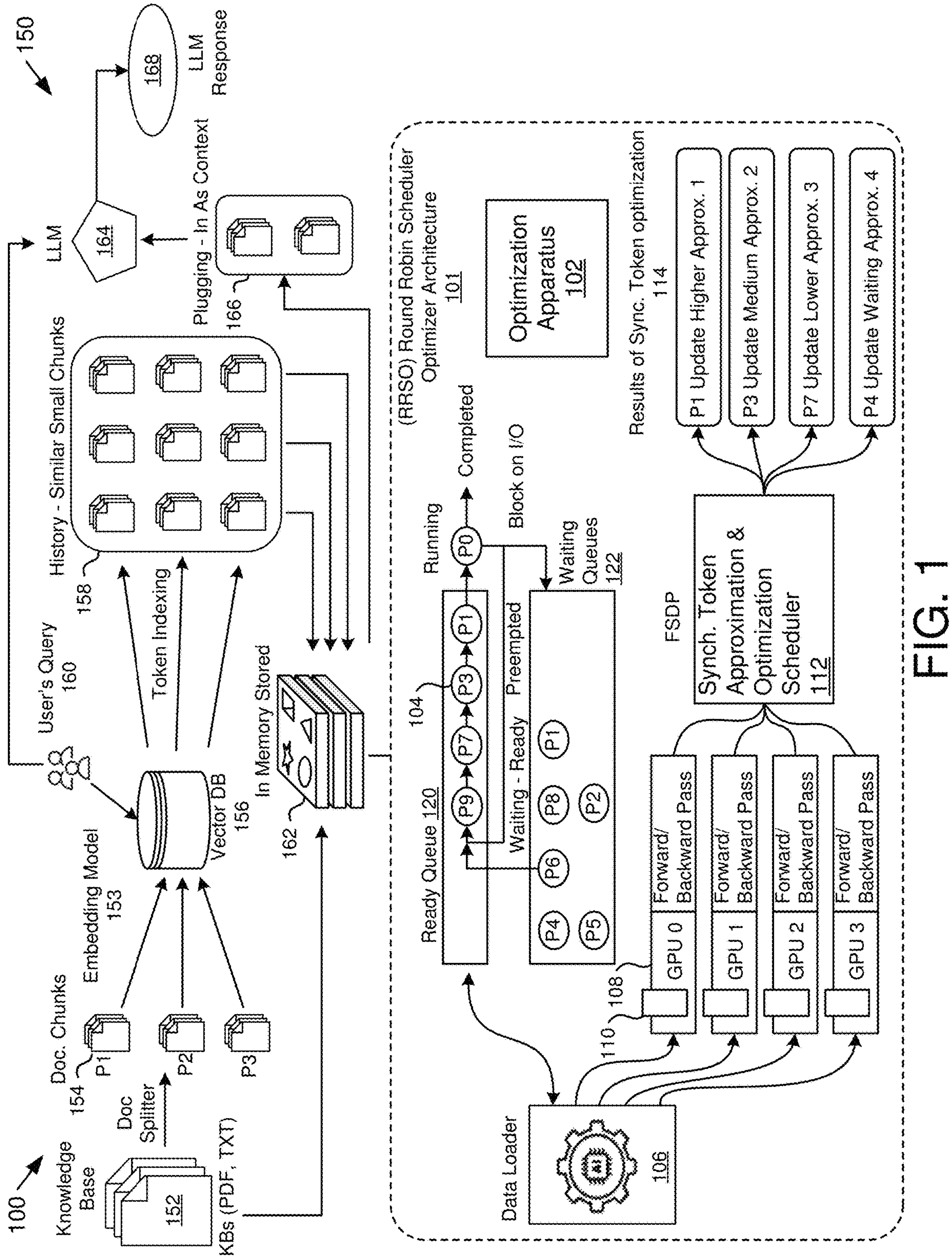
FIG. 1 is a schematic block diagram illustrating a system for using a round robin scheduler optimizer to improve processor memory utilization in an artificial intelligence ("AI") engine, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for using a round robin scheduler optimizer to improve processor memory utilization in an AI engine is disclosed. An apparatus and computer program product also perform the functions of the method. The method includes receiving, from a retrieval engine, a plurality of tokens identified as being related to key words from a user's query submitted to an artificial intelligence engine. The tokens are indexed to data segments stored by a LLM. The method includes placing, using a round robin scheduler optimizer, first tokens identified as most relevant to the user's query in a ready queue and placing, using the round robin scheduler optimizer, second tokens identified as less relevant to the user's query in a waiting queue, and using a fully shared data parallel ("FSDP") engine to retrieve first data segments indexed to the first tokens into cache memory proximate to each other and to retrieve second data segments indexed to the second tokens into the cache memory proximate to the first data segments.

In some embodiments, the method includes processing the first data segments and providing a response to the user's query via a user interface. In other embodiments, the user's query is a first user's query, and the method includes receiving a second user's query related to the first user's query, identifying one or more of the second tokens as being related to the second user's query, determining that the second data segments indexed to the one or more of the second tokens related to the second user's query are stored in the cache memory, and processing the second data segments indexed to the one or more of the second tokens related to the second user's query that are stored in cache memory during processing to provide a response to the second user's query.

In other embodiments, identifying the one or more second tokens as being related to the second user's query includes using a reranking engine. A reranking engine is defined as AI search algorithm that seeks to improve the semantic search relevance of the tokens 104 using filters dynamically by reordering the results returned by the AI model 150. In other embodiments, the first data segments are distributed in cache memory of a plurality of processors using FSDP and processing the first data segments includes processing the first data segments in parallel using the plurality of processors. In other embodiments, the processors are graphics processing units ("GPUs"). In other embodiments, the first data segments are processed in parallel along with data segments associated with a plurality of other queries.

In some embodiments, the first data segments and the second data segments are partitioned in fixed size data segments where a size of the partitions of the data segments is selected by a user during a provisioning process. In other embodiments, the waiting queue includes a plurality of queues organized by topic and/or key word.

An apparatus for using a round robin scheduler optimizer to improve processor memory utilization in an AI engine includes a processor and non-transitory computer readable storage media storing code. The code is executable by the processor to perform operations that include receiving, from a retrieval engine, a plurality of tokens identified as being related to key words from a user's query submitted to an artificial intelligence engine. The tokens are indexed to data segments stored by a LLM. The operations include placing, using a round robin scheduler optimizer, first tokens identified as most relevant to the user's query in a ready queue and placing, using the round robin scheduler optimizer, second tokens identified as less relevant to the user's query in a waiting queue, and using a FSDP engine to retrieve first data segments indexed to the first tokens into cache memory proximate to each other and to retrieve second data segments indexed to the second tokens into the cache memory proximate to the first data segments.

In some embodiments, the apparatus includes operations for processing the first data segments and providing a response to the user's query via a user interface. In other embodiments, the user's query is a first user's query, and the operations include receiving a second user's query related to the first user's query, identifying one or more of the second tokens as being related to the second user's query, determining that the second data segments indexed to the one or more of the second tokens related to the second user's query are stored in the cache memory, and processing the second data segments indexed to the one or more of the second tokens related to the second user's query that are stored in cache memory during processing to provide a response to the second user's query. In other embodiments, identifying the one or more second tokens as being related to the second user's query includes using a reranking engine.

In some embodiments, the first data segments are distributed in cache memory of a plurality of processors using FSDP and processing the first data segments includes processing the first data segments in parallel using the plurality of processors. In other embodiments, the processors are GPUs. In other embodiments, the first data segments are processed in parallel along with data segments associated with a plurality of other queries. In other embodiments, the first data segments and the second data segments are partitioned in fixed size data segments where a size of the partitions of the data segments is selected by a user during a provisioning process. In other embodiments, the waiting queue includes a plurality of queues organized by topic and/or key word.

A program product for using a round robin scheduler optimizer to improve processor memory utilization in an AI engine includes a non-transitory computer readable storage medium storing code. The code is configured to be executable by a processor to perform operations that include receiving, from a retrieval engine, a plurality of tokens identified as being related to key words from a user's query submitted to an artificial intelligence engine. The tokens are indexed to data segments stored by a LLM. The operations include placing, using a round robin scheduler optimizer, first tokens identified as most relevant to the user's query in a ready queue and placing, using the round robin scheduler optimizer, second tokens identified as less relevant to the user's query in a waiting queue, and using a FSDP engine to retrieve first data segments indexed to the first tokens into cache memory proximate to each other and to retrieve second data segments indexed to the second tokens into the cache memory proximate to the first data segments.

In some embodiments, the user's query is a first user's query and the operations include processing the first data segments and providing a response to the first user's query via a user interface, receiving a second user's query related to the first user's query, identifying one or more of the second tokens as being related to the second user's query, determining that the second data segments indexed to the one or more of the second tokens related to the second user's query are stored in the cache memory, and processing the second data segments indexed to the one or more of the second tokens related to the second user's query that are stored in cache memory during processing to provide a response to the second user's query.

FIG. 1 is a schematic block diagram illustrating a system 100 for using a round robin scheduler optimizer 101 to improve processor memory utilization in an AI engine 150, according to various embodiments. The system 100 includes an optimization apparatus 102 in a round robin scheduler optimizer ("RRSO") architecture 101 (or round robin scheduler optimizer 101 or RRSO 101) that includes tokens 104 each labeled with a "P" followed by number in an oval, a data loader 106, graphics processing units ("GPUs") 108, GPU cache 110, a synchronous token approximation and optimization scheduler 112 using fully shared data parallel ("FSDP"), and results 114 of synchronous token optimization. AI engine 150 components are depicted above the RRSO architecture 101 and include a knowledge base 152 with various documents, document chunks 154, a vector database ("DB") 156, indexed small document chunks 158, a user's query 160, non-volatile memory 162 with various components of the AI engine 150, a large language model ("LLM") 164, contextualized indexed document chunks 166 that plug small document chunks in as context into the LLM 164, and a LLM response 168, which are explained below.

A typical AI engine 150 is built and trained on a knowledge base 152 using various digital documents in the form of portable data font ("PDF") documents, text documents, spreadsheets, documents formatted using a editor, such as Microsoft® Word, digitized documents, or any other form of document readable by a computing device. An embedding model 153 typically splits the knowledge base into document chunks 154, which are data segments, where the document chunks 154 are based on various topics, key words, etc. The document chunks 154 are data segments of various lengths, such as individual word, paired words, sentences, portions of a paragraph, paragraphs, etc. The document chunks 154, in other embodiments, includes other data structures and data types, such as tables, numbers, formulas, etc. In other embodiments, the document chunks 154 include other forms of data, such as figures, drawings, photographs, and the like and may include information about the figures, drawings, etc.

The embedding model 153 typically indexes the document chunks 154 to organize the document chunks 154 for retrieval and creates tokens 104 indexed to the document chunks 154 to created indexed document chunks 158. The indexed document chunks 154 are typically part of a large language model 164 used to service a user's query 160 about some topic. The LLM 164, in some embodiments, uses contextualized indexed document chunks 166 plugged in with context to provide further information to the LLM 164 in providing a LLM response 168 to the user's query 160.

AI engines 150 typically consume a large amount of computing resources that limit use on smartphones, laptop computers, desktop computer, tablet computers, and the like. Decreasing use of computing resources is a desirable goal for AI engines 150. The round robin scheduler optimizer architecture 101 is implemented in the AI engine 150 and serves to reduce use computing resources by optimizing cache of processors 108 executing code and data related to a user's query 160 where the processors 108 are operating in parallel. The processors 108, as depicted in FIG. 1 are graphics processing units ("GPUs") 108, but may also be central processing units ("CPUs"), accelerators, or other processor types. The RRSO architecture 101 includes a ready queue 120 for tokens 104 most relevant to the user's query 160 and a waiting queue 122 for tokens related to the user's query 160 but not as relevant so that the cache memory 110 of the processors 108 includes relevant material for related queries. The optimization apparatus 102 is described in more detail below with regard to the apparatuses 300, 400 of FIGS. 3 and 4.

The vector DB 156, knowledge base 152, document chunks 154, code of the LLM 164, and other parts of the AI engine 150 are stored in non-volatile memory 162 where portions are pulled into volatile memory as necessary for execution by one or more processors 108. The non-volatile memory 162 may include hard disk drives ("HDDs"), solid-state drives ("SSDs"), optical drives, or other forms of non-volatile memory known in the art as well as other forms of non-volatile memory developed in the future. In some embodiments, the non-volatile memory 162 is part of a storage area network ("SAN") or other storage structure and data from the SAN or other storage structure is available to processors 108 and other computing devices supporting the system 100.

The RRSO architecture 101 includes the optimization apparatus 102, tokens 104, a data loader 106, processors 108, cache memory 110 for the processors 108, a synchronization token approximation and optimization scheduler 112, results 114 of the synchronization token approximation and optimization scheduler 112, the ready queue 120, and the waiting queue 122, which are described below. The tokens 104 are typically created by the embedding model 153 and are indexed to document chunks 154 as well as to other words, numbers, etc. within the document chunks 154. For example, a user's query 160 might include "Which forest did Robin Hood steal from the rich to give to the poor?" Documents in the knowledge base 152 may include passages from various literary works about the legendary Robin Hood, mentions of Robin Hood in other literary works, such as Shakespeare's "The Two Gentlemen of Verona," commentaries on the Robin Hood character, and the like. The embedding model 153 may extract various passages from the knowledge base 152 to create document chunks 154 containing information related to Robin Hood.

The embedding model 153 may index key words from the passages regarding Robin Hood, such as "Robin," "Hood," "forest," "Sherwood," "Nottingham," "King," "Richard," "Lionheart," "Prince," "John," "Maid," "Marian," "Merry," "Men," "rich," "poor," and the like. The embedding model 153, in some embodiments, creates tokens 104 that include a measure of closeness between words found in the passages about Robin Hood that are in the knowledge base 152 so that the indexed small document chunks 158 are organized to help the LLM 164 respond to user's queries 160 about Robin Hood. The AI engine 150, in some embodiments, stores the tokens 104 in a vector database 156. When a user submits a user's query 160, the LLM 164, in some embodiments, uses key words from the user's query 160 to identify tokens 104 that are close to the key words from the user's query 160 and constructs an LLM response 168 that answers the user's query 160. In some embodiments, the LLM 164 adds context via the contextualized document chunks 166 to aid in formulating the LLM response 168.

The optimization apparatus 102 of the RRSO architecture 101 places tokens 104 that are the most relevant to the user's query 160 in the ready queue 120. The most relevant tokens 104, which are depicted as P1, P3, P7, and P9, may be related to words like "forest," "Robin," "Hood," "rich," "poor," "steal,", etc. the optimization apparatus 102 places less relevant tokens 104 in the waiting queue 122, such as tokens 104 related to "king," "Richard," "Marian," Prince," "John," etc.

The data loader 106, in some embodiments, fetches document chunks 154 indexed to the most relevant tokens 104 first and places the document chunks 154 in cache memory 110 for each the several processors 108 arranged for parallel processing of the user's query 160. The data loader 106 then fetches document chunks 154 indexed to other less related tokens 104 that are in the waiting queue 122. The optimization apparatus 102 uses, in some embodiments, the synchronization token approximation and optimization scheduler 112, which uses FSDP to place the document chunks 154 in the cache memory 110 in close proximity so that processing of the document chunks 154 in the cache memory 110 is more efficient than if the document chunks 154 were placed randomly in the cache memory 110.

Figure 2:
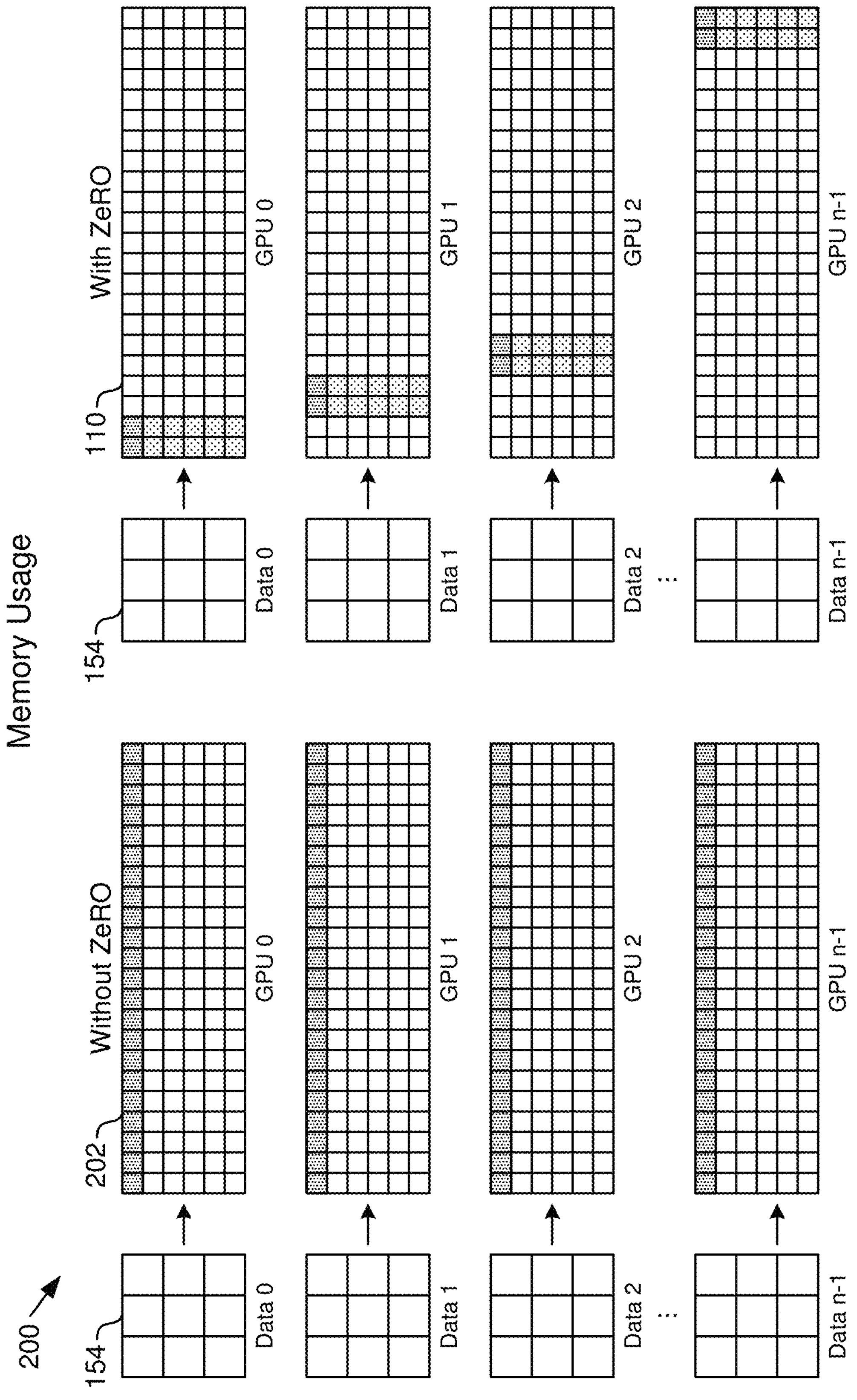
FIG. 2 is a schematic block diagram illustrating processor memory usage with and without a Zero Redundancy Optimizer ("ZeRO"), according to various embodiments.

FIG. 2 is a schematic block diagram 200 illustrating processor memory usage with and without a Zero Redundancy Optimizer ("ZeRO"), according to various embodiments. The left side of the diagram 200 includes cache memory 202 without ZeRO where document chunks 154 are loaded in the cache memory 110 as received, as processed, etc. without any particular placement strategy.

ZeRO leverages data parallelism to reduce memory and compute requirements of each processor 108 (e.g., GPUs 108) used to process user's queries 160. ZeRO partitions the document chunks, for example, into 4, 8, 16, or 32 bytes, or other partition, across the cache memory 110 of the processors 108, which increases processing speeds related to the various user's queries 160 stored in the cache memory 110 of the processors 108. The right side of the diagram 200 of FIG. 2 depicts how partitioned data is striped across the cache memory 110 of the GPUs 108 from GPU 0 to GPU n. The striping is intended to illustrate the concept but may be striped differently than depicted in FIG. 2.

ZeRO is also called FSDP. The synchronization token approximation and optimization scheduler 112 loads shards of the document chunks 154, code, etc. that is to be processed where a shard is a horizontal partition of data. The partitions are sized as selected by the user. In a forward path, the synchronization token approximation and optimization scheduler 112 runs an all_gather process to collect all shards from all ranks to recovery a full parameter in a FSDP unit, runs a forward computation, and discards parameter shards that were just collected. In a backward path, the synchronization token approximation and optimization scheduler 112 runs an all_gather process to collect all shards from all ranks to recover the full parameter if the FSDP unit, runs a backward computation, runs a reduce_scatter process to synchronize gradients, and discards parameters. A result is distributing data as depicted in the right side of the diagram 200 of FIG. 2 with ZeRO where data is efficiently striped for processing across the cache memories 110 of the GPUs 108.

The synchronization token approximation and optimization scheduler 112 sorts data segments indexed to tokens 104 into results 114 as depicted in FIG. 1. A data segment indexed to token 104 P1 has a higher priority than a data segment indexed to token 103 P3, which is depicted as medium priority. The data segment indexed to token 104 P7 has a lower priority than P1 or P3 and the data segment indexed to token 104 P4 has a lowest priority so that token 104 P4 is stored in the waiting queue 122. However, data segments from tokens 104 in the waiting queue 122 are placed in cache memory 110 for later use for related user's queries 160.

The system 100, in some embodiments, is implemented on a cloud computing network using servers, storage devices, switches, and the like, which may be located in a datacenter. In other embodiments, the system 100 runs on one or more computing devices at a customer location, such as an edge location. In other embodiments, the system 100 runs on a desktop computer, a laptop computer, or the like. One of skill in the art will recognize other environments suitable to implement the system 100 with a round robin scheduler optimizer 101. In some embodiments, users are remote and access the AI engine 150 on client devices. The LLM response 168 is then transmitted to the user via the client and displayed on an electronic display connected to the client device.

Figure 3:
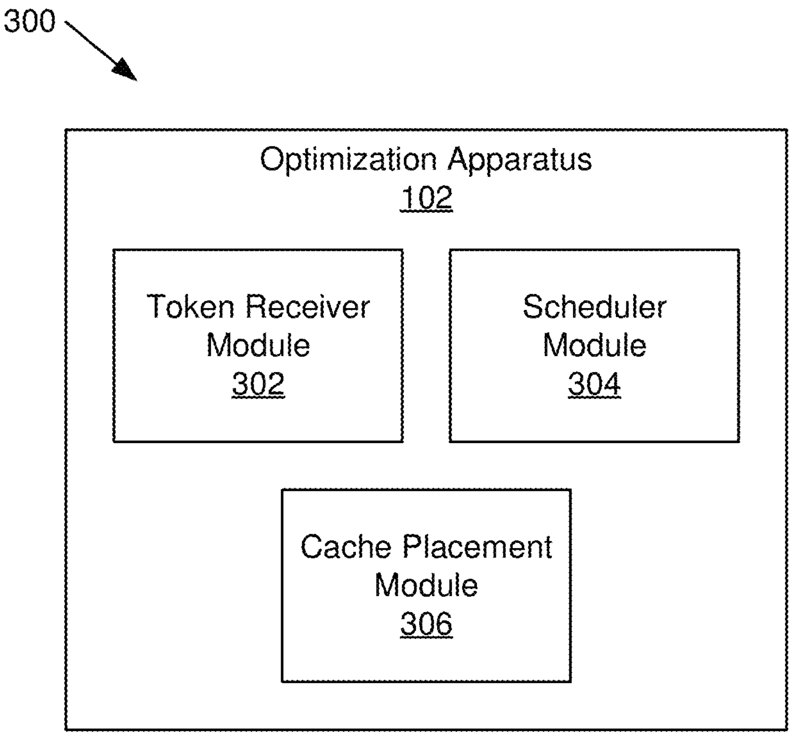
FIG. 3 is a schematic block diagram illustrating an apparatus for using a round robin scheduler optimizer to improve processor memory utilization in an AI engine, according to various embodiments.

FIG. 3 is a schematic block diagram illustrating an apparatus 300 for using a round robin scheduler optimizer to improve processor memory utilization in an AI engine 150, according to various embodiments. The apparatus 300 includes an optimization apparatus 102 with a token receiver module 302, a scheduler module 304, and a cache placement module 306, which are described below. In some embodiments, the apparatus 300 is implemented using code stored in a computer readable storage medium, which is non-transitory. In some embodiments, the computer readable storage medium is the non-volatile memory 162 and/or other volatile memory accessible to servers, processors 108, etc. of the system 100. In other embodiments, all or a portion of the apparatus 300 is implemented using a programmable hardware device, such as an FPGA, and/or a portion is implemented using hardware circuits.

The apparatus 300 includes a token receiver module 302 configured to receive, from a retrieval engine, a plurality of tokens 104 identified as being related to key words from a user's query 160 submitted to an AI engine 150. The tokens 104 are indexed to data segments stored by a LLM 164. The data segments, in some embodiments, are the document chunks 154 gleaned from the documents of the knowledge base 152 and may include other data, such as code to be processed, indexing information, vectors, or any other data indexed to the tokens 104.

In some embodiments, the token receiver module 302 receives the tokens 104 in response to the AI engine 150 responding to a user's query 160. In some embodiments, the retrieval engine is part of the LLM 164 and is configured to access the vector database 156 and indexing information stored therein to retrieve tokens 104 that are related to the user's query 160. In some embodiments, the retrieval engine retrieves tokens 104 that are related to the user's query 160 above a threshold. In some embodiments, the tokens 104 include information indicating an amount of closeness to one or more keywords of the user's query 160. One of skill in the art will recognize other ways that a retrieval engine identifies and/or transmits tokens 104 related to a user's query 160.

In some embodiments, the token receiver module 302 receives or accesses results from the retrieval engine and pulls the identified tokens 104 instead of waiting for to receive the tokens 104. As used herein, the token receiver module 302 receiving a plurality of tokens identified as being related to key words from a user's query 160 include receiving the tokens 104 or retrieving the tokens 104 in response to the retrieval engine identifying the tokens 104. In some embodiments, the tokens 104 are retrieved or received from the vector database 156.

The apparatus 300 includes a scheduler module 304 configured to use a round robin scheduler optimizer ("RRSO") 101 to place first tokens 104 identified as most relevant to the user's query 160 in a ready queue 120. The scheduler module 304 uses the RRSO 101 to place second tokens 104 identified as less relevant to the user's query 160 in a waiting queue 122. As depicted in FIG. 1, the ready queue 120 includes tokens 104 labeled P1, P3, P7, and P9, which are designated by the retrieval engine as most relevant to the user's query 160. As depicted in FIG. 1, the token 104 labeled P0 is currently listed as "running" which indicates that the data loader 106 is fetching data segments related to P0 into cache memory 110 of one of the GPUs 108. The token 104 labeled P1 is next in the ready queue 120 to be accessed by the data loader 106, which then retrieves and loads data segments indexed to P1 into cache memory 110 of the GPUs 108. The processing order in the ready queue 120 is P1, then P3, then P7, then P9. In some embodiments, the tokens 104 are returned to the ready queue 120 after processing or are placed in the waiting queue 122 in anticipation of receiving a related user's query 160.

The schedule module 304 uses the RRSO 101 to place the second tokens 104 in the waiting queue 122. In some embodiments, the waiting queue 122 includes multiple queues depicted in FIG. 1 as vertical alignments of tokens. The various queues in the waiting queue 122 are organized by topic, by key word, or the like. The schedule module 304, in some embodiments, maintains the waiting queue 122 for a period of time so that subsequent user's queries 160 that are related to the first user's query may quickly access data segments stored in cache memory 110. In some embodiments, the tokens 104 in the waiting queue 122 are maintained until overwritten by another user's query. In some embodiments, the RRSO 101 include numerous ready queues 120 and waiting queues 122. Typically the cache memory 110 includes data segments from numerous queries. In some embodiments, the number of ready queues 120 and waiting queue 122 is configurable by a user and is limited by an amount of cache memory 110 for the processors 108.

In some embodiments, the waiting queue 122 is eventually overwritten with tokens 104 from another query. In some embodiments, the ready queue 120 and waiting queue 122 are part of a number of queues and incoming tokens 104 from various user's queries eventually rotate back to the depicted ready queue 120 and waiting queue 122. In some embodiments, the ready queues 120 and/or waiting queues 122 are cleared when data segments in cache memory 110 indexed to the tokens 104 in the queues 120, 122 is cleared or overwritten. In other embodiments, the RRSO 101 includes more waiting queues 122 than ready queues 120 and the ready queues 120 are used to feed tokens 104 to be processed by the data loader 106 and/or synchronization token approximation and optimization scheduler 112 where tokens 104 are returned to a waiting queue 122 and the waiting queues 122 are kept longer waiting for a related user's query 160 while the ready queues 120 are used more frequently for current processing of tokens 104. One of skill in the art will recognize other ways to configure and use ready queues 120 and waiting queues 122 to allow for cached data to be used for related user's queries 160.

The apparatus 300 includes a cache placement module 306 configured to use a fully shared data parallel ("FSDP") engine to retrieve first data segments indexed to the first tokens 104 into cache memory 110 proximate to each other and to retrieve second data segments indexed to the second tokens 104 into the cache memory 110 proximate to the first data segments.

In some embodiments, the cache placement module 306 uses the data loader 106, in conjunction with the synchronization token approximation and optimization scheduler 112 using FSDP to partition the data segments indexed to P1 into smaller chunks and then to stripe the partitioned data segments indexed to P1 across the cache memory 110 of the GPUs 108 using the FSDP process for efficient parallel processing of the data segments indexed to P1. The size of the partitioned data chunks, in some embodiments, is selected to be 4, 8, 16, 32 bytes and the size is selected by a user, for example, during initial setup and configuration of the AI engine 150 and RRSO 101.

The cache placement module 306 then retrieves data segments indexed to P3 and places the data segments in cache memory 110 of the processors 108 using FSDP. The cache placement module 306 then retrieves data segments indexed to P7, then P9. Once data segments from the first tokens 104 in the ready queue 120 are in the cache memory 110 of the processors 108, the cache placement module 306 retrieves the data segments indexed to the second tokens 104 in the waiting queue 122 and places the data segments into the cache memory 110 of the processors 108 using FSDP. In some embodiments, the cache placement module 306 places the data segments indexed to the second tokens 104 of the waiting queue 122 proximate to the data segments indexed to the first tokens 104. Thus, the data segments of the first tokens 104 of the ready queue 120 are available to be processes first for answering the user's query 160 and the data segments indexed to the second tokens 104 of the waiting queue 122 are loaded for efficient processing for a user's query 160 that is related to the first user's query 160.

Figure 4:
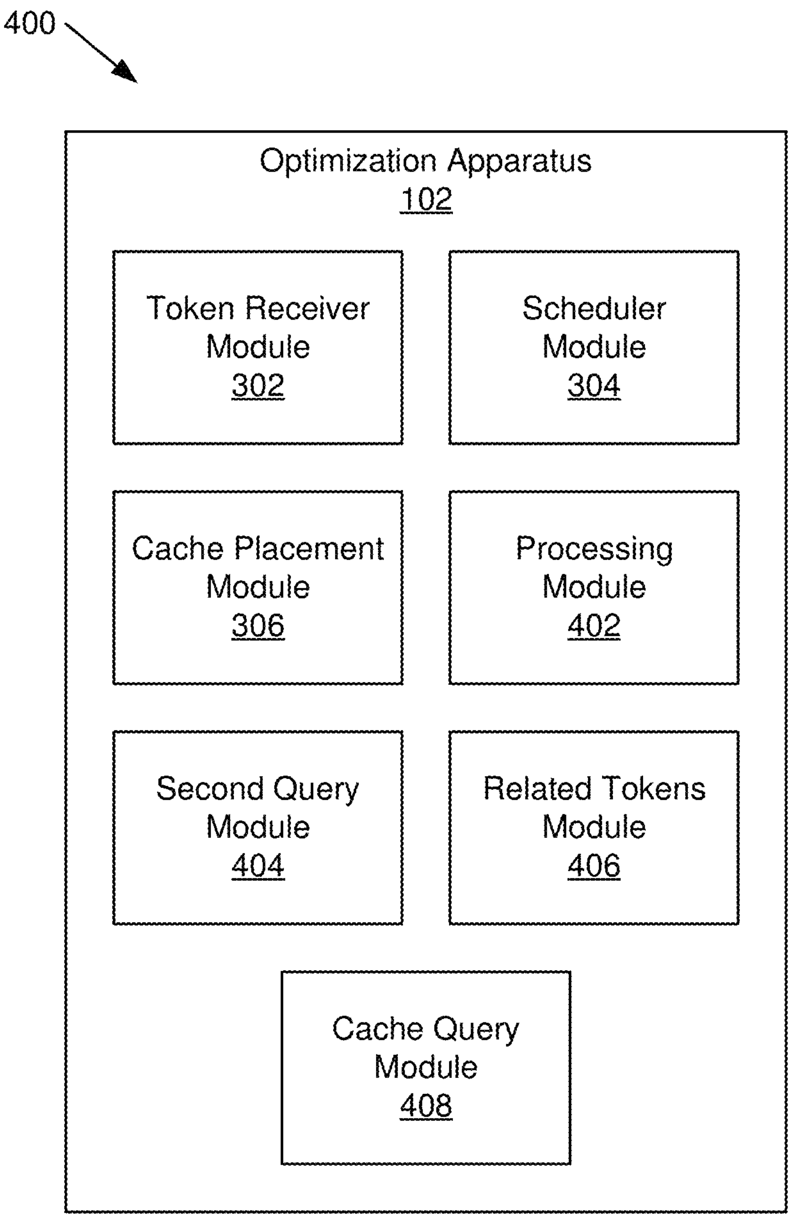
FIG. 4 is a schematic block diagram illustrating another apparatus for using a round robin scheduler optimizer to improve processor memory utilization in an AI engine, according to various embodiments.

FIG. 4 is a schematic block diagram illustrating another apparatus 400 for using a round robin scheduler optimizer 101 to improve processor memory utilization in an AI engine 150, according to various embodiments. The apparatus 400 includes another optimization apparatus 102 with a token receiver module 302, a scheduler module 304, and a cache placement module 306, which are substantially similar to those described above in relation to the apparatus 300 of FIG. 3. The apparatus 400, in various embodiments, includes a processing module 402, a second query module 404, a related tokens module 406, and a cache query module 408, which are described below. In various embodiments, all or a portion of the apparatus 400 of FIG. 4 is implemented similar to the apparatus 300 of FIG. 3.

The apparatus 400 includes a processing module 402 configured to process the first data segments and to provide a response to the user's query 160 via a user interface. The first data segments are indexed to the first tokens 104 that are in the ready queue 120. In some embodiments, the processing module 402 uses the LLM 164 to process the first data segments and to provide the response to the user's query 160. In other embodiments, the processing module 402 is part of the LLM 164. In some embodiments, the user interface is an electronic display and may be at a location where the user input the user's query 160, such as a remote client device. In other embodiments, the processing module 402 uses the processors 108, which may be GPUs 108, to process the first data segments. In some embodiments, the processing module 402 operates the processors 108 in parallel to process the first data segments as partitioned data chunks are striped across the cache memory 110 of the cache memory 110 of the processors 108 in a way to efficiently process the first data segments. In some embodiments, the processing module 402 processes the first data segments and then processes data segments related to other user's queries 160 as the AI engine 150 is configured to process numerous user's queries 160 quickly. For example, the cache memory 110 of the processors 108 may include data segments from tens, hundreds or thousands of user's queries.

In some embodiments, the user's query 160 is a first user's query 160 and the apparatus 400 includes a second query module 404 configured to receive a second user's query 160 related to the first user's query 160. In the example listed above, the first user's query 160 may be "Which forest did Robin Hood steal from the rich to give to the poor?" A second user's query 160 is on the same topic of Robin Hood and may be "What is the name of the sheriff of Nottingham that was the enemy of Robin Hood," which is related to the first user's query 160 in that both involve Robin Hood.

In some embodiments, the apparatus 400 includes a related tokens module 406 configured to identify one or more of the second tokens 104 in the waiting queue 122 as being related to the second user's query 160. Second tokens 104 in the waiting queue 122 may be related to "sheriff," "Nottingham," etc. and the cache placement module 306 may have then already loaded second data segments indexed to the second tokens 104 in the waiting queue. In addition, the second user's query 160 may be related to first tokens 104 of the ready queue 120 so that first data segments indexed to the first tokens 104 is also in cache memory 110 of the processors 108. In some embodiments, once the first tokens 104 in the ready queue 120 are processed, the first tokens 104 are placed in the waiting queue 122. The related tokens module 406, in some embodiments, uses a reranking engine. In some embodiments, the related tokens module 406 includes identifying which tokens 104 in the ready queue 120 and/or in the waiting queue 122 are related to the second user's query 160. In some embodiments, the related tokens module 406 moves the tokens 104 related to the second user's query 160 into the ready queue 120.

In other embodiments, the related tokens module 406 identifies additional tokens 104 that are not in either the ready queue 120 or the waiting queue 122 and uses the scheduler module 304 to place the additional tokens 104 into the ready queue 120. In other embodiments, the related tokens module 406 uses the cache placement module 306 to retrieve data segments indexed to the additional tokens 104 and to place the data segments indexed to the additional tokens 104 into cache memory 110 of the processors 108.

In some embodiments, the apparatus 400 includes a cache query module 408 configured to determine that the second data segments indexed to the one or more of the second tokens 104 in the waiting queue 122 related to the second user's query 160 are stored in the cache memory 110 of the processors 108. In some examples, the cache memory 110 determines that the data segments indexed to the tokens 104 related to the second user's query 160 and directs the processing module 402 to use the data segments in the cache memory 110 to process the second user's query 160. In other examples, the cache query module 408 determines that the data segments indexed to tokens 104 related to the second user's query 160 are no longer in cache memory 110. For example, the data segments indexed to the tokens 104 related to the second user's query 160 may have been overwritten by data segments from other user's queries.

Figure 5:
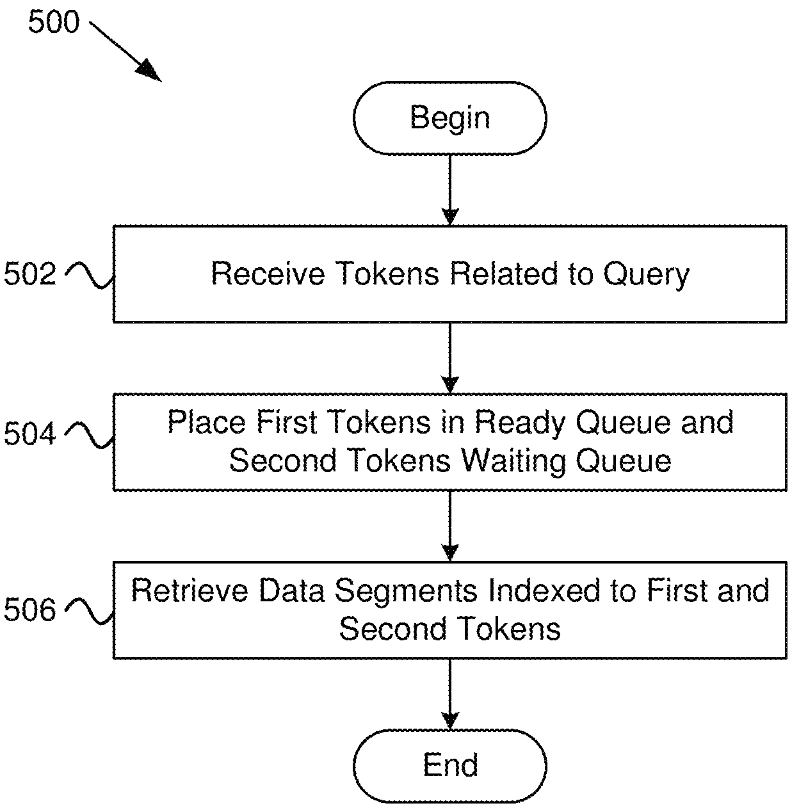
FIG. 5 is a schematic flow chart diagram illustrating a method for using a round robin scheduler optimizer to improve processor memory utilization in an AI engine, according to various embodiments.

FIG. 5 is a schematic flow chart diagram illustrating a method 500 for using a round robin scheduler optimizer 101 to improve processor memory utilization in an AI engine 150, according to various embodiments. The method 500 begins and receives 502, from a retrieval engine, a plurality of tokens 104 identified as being related to key words from a user's query 160 submitted to an artificial intelligence engine 150. The tokens 104 are indexed to data segments stored by large language model 164. The method 500 places 504, using a round robin scheduler optimizer 101, first tokens 104 identified as most relevant to the user's query 160 in a ready queue 120 and places 504, using the round robin scheduler optimizer 101, second tokens 104 identified as less relevant to the user's query 160 in a waiting queue 122. The method 500 uses a fully shared data parallel ("FSDP") engine, which in some embodiments is part of the synchronization token approximation and optimization scheduler 112, to retrieve 506 first data segments indexed to the first tokens 104 into cache memory 110 proximate to each other and to retrieve 506 second data segments indexed to the second tokens 104 into the cache memory 110 proximate to the first data segments, and the method 500 ends. In various embodiments, all or a portion of the method 500 is implemented using the token receiver module 302, the scheduler module 304, and/or the cache placement module 306.

Figure 6A:
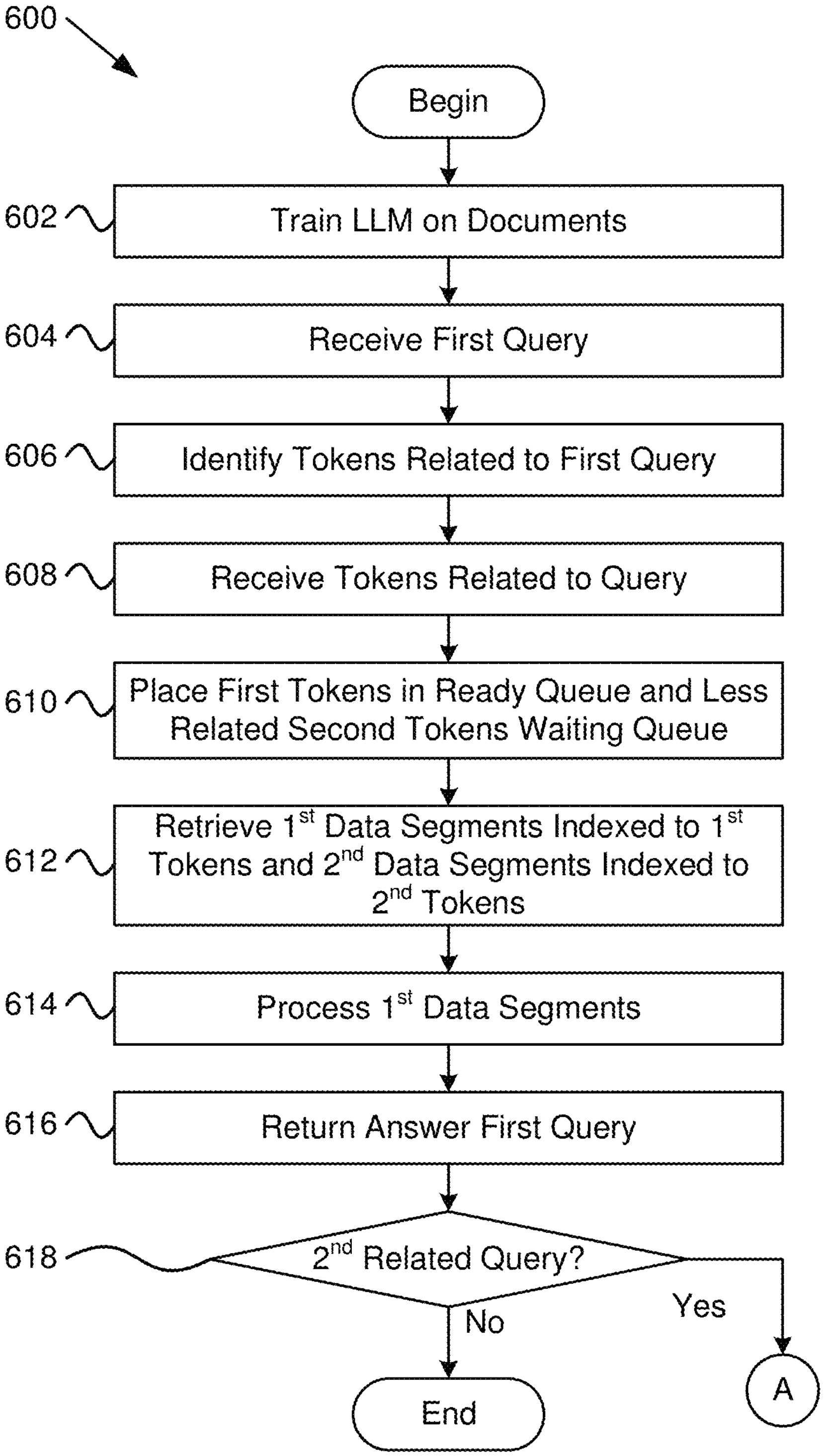
FIG. 6A is a first part of a schematic flow chart diagram illustrating another method for using a round robin scheduler optimizer to improve processor memory utilization in an AI engine, according to various embodiments.
Figure 6B:
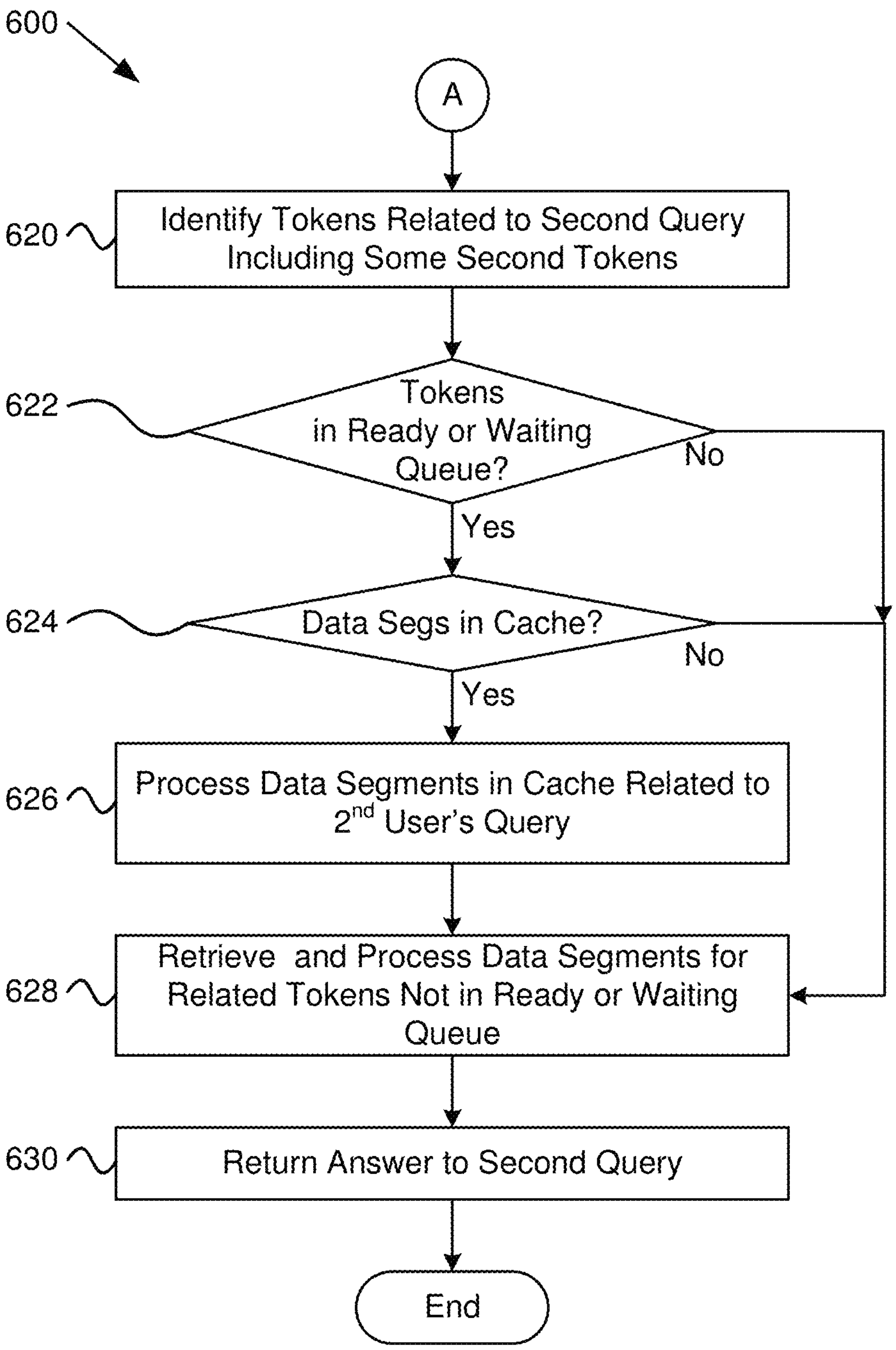
FIG. 6B is a second part of a schematic flow chart diagram of the method of FIG. 6A, according to various embodiments.

FIG. 6A is a first part and FIG. 6B is a second part of a schematic flow chart diagram illustrating another method 600 for using a round robin scheduler optimizer 101 to improve processor memory utilization in an AI engine 150, according to various embodiments. The method 600 begins and trains 602 a LLM 164 using documents from a knowledge base 152. The knowledge base 152 may include general knowledge or specific areas of knowledge. In some embodiments, the method 600 trains the LLM 164 using an embedding model 153, which splits documents from the knowledge base 152 into document chunks 154 and indexes material from the documents chunks 154 using vectors stored in a vector database 156. The vector database 156 includes tokens 104 indexed to the document chunks 154 and other indexing data, such as indications of a closeness of key words to each other.

The method 600 receives 604 a first user's query 160 and identifies 606, for example using the LLM 164, tokens related to the first user's query 160. The method 600 receives 608, from a retrieval engine, a plurality of tokens 104 identified as being related to key words from the first user's query 160. The tokens 104 are indexed to data segments stored by the LLM 164. The method 600 places 610, using a round robin scheduler optimizer 101, first tokens 104 identified as most relevant to the first user's query 160 in a ready queue 120 and places 610, using the round robin scheduler optimizer 101, second tokens 104 identified as less relevant to the first user's query 160 in a waiting queue 122.

The method 600 retrieves 612, using a FSDP engine, first data segments indexed to the first tokens 104 into cache memory 110 of processors 108 proximate to each other and retrieves 612 second data segments indexed to the second tokens 104 into the cache memory 110 of the processors 108 proximate to the first data segments. In some embodiments, the FSDP engine is part of the synchronization token approximation and optimization scheduler 112. The method 600 processes 614 the first data segments and returns 616 an answer to the first user's query 160 to a user interface.

The method 600 determines 618 if there is a second user's query 160 related to the first query. If the method 600 determines 618 that there is not a second user's query 160 related to the first user's query 160, the method 600 ends. Note that if there is a second user's query 160 that is not related to the first user's query 160, the method 600 may begin again with the second user's query being a first user's query 160.

If the method 600 determines 618 that there is a second user's query 160 related to the first user's query 160, the method 600 (follow "A" on FIG. 6A to "A" on FIG. 6B) identifies 620 one or more tokens 104 related to the second user's query 160, and using a reranking engine, determines 622 if some of the identified tokens 104 related to the second user's query 160 are first or second tokens 104 in the ready queue 120 or in the waiting queue 122. If the method 600 determines 622 that some of the identified tokens 104 related to the second user's query 160 were in first in the ready queue 120 or are second tokens 104 in the waiting queue 122, the method 600 determines 624 if the first data segments and/or the second data segments indexed to the first tokens 104 and/or second tokens 104 that are related to the second user's query 160 are in cache memory 110 of the processors 108.

If the method 600 determines 624 second data segments indexed to the second data tokens 104 in the waiting queue 122 that are related to the second user's query 160 are in the cache memory 110 of the processors 108, the method 600 processes 626 the second data segments in cache memory 110 and the method 600 retrieves 628 and processes 628 data segments for related tokens 104 that were not in the ready queue 120 or the waiting queue 122 or had data segments in cache memory 110 and returns 630 an answer to the second user's query 160, and the method 600 ends.

If the method 600 determines 622 that tokens 104 related to the second user's query 160 are not first tokens 104 that were in the ready queue 120 and/or second tokens 104 that are in the waiting queue 122 or determines 624 that first or second data segments indexed to the first or second tokens 104 related to the second user's query 160 are not in the cache memory 110, the method 600 retrieves 628 and processes 628 data segments for related tokens 104 that were not in the ready queue 120 or the waiting queue 122 or had data segments in cache memory 110 and returns 630 an answer to the second user's query 160, and the method 600 ends. In various embodiments, all or a portion of the method 500 is implemented using the token receiver module 302, the scheduler module 304, the cache placement module 306, the processing module 402, the second query module 404, the related tokens module 406, and/or the cache query module 408.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving, from a retrieval engine, a plurality of tokens identified as being related to key words from a user's query submitted to an artificial intelligence engine, the tokens indexed to data segments stored by a large language model ("LLM");

placing, using a round robin scheduler optimizer, first tokens identified as most relevant to the user's query in a ready queue and placing, using the round robin scheduler optimizer, second tokens identified as less relevant to the user's query in a waiting queue; and using a fully shared data parallel ("FSDP") engine to retrieve first data segments indexed to the first tokens into cache memory proximate to each other and to retrieve second data segments indexed to the second tokens into the cache memory proximate to the first data segments.

2. The method of claim 1, further comprising processing the first data segments and providing a response to the user's query via a user interface.

3. The method of claim 2, wherein the user's query comprises a first user's query, and further comprising:

receiving a second user's query related to the first user's query;

identifying one or more of the second tokens as being related to the second user's query;

determining that the second data segments indexed to the one or more of the second tokens related to the second user's query are stored in the cache memory; and processing the second data segments indexed to the one or more of the second tokens related to the second user's query that are stored in cache memory during processing to provide a response to the second user's query.

4. The method of claim 3, wherein identifying the one or more second tokens as being related to the second user's query comprises using a reranking engine.

5. The method of claim 2, wherein the first data segments are distributed in cache memory of a plurality of processors using FSDP and wherein processing the first data segments comprises processing the first data segments in parallel using the plurality of processors.

6. The method of claim 5, wherein the processors comprise graphics processing units ("GPUs").

7. The method of claim 5, wherein the first data segments are processed in parallel along with data segments associated with a plurality of other queries.

8. The method of claim 1, wherein the first data segments and the second data segments are partitioned in fixed size data segments, wherein a size of the partitions of the data segments is selected by a user during a provisioning process.

9. The method of claim 1, wherein the waiting queue comprises a plurality of queues organized by topic and/or key word.

10. An apparatus comprising:
- a processor; and
- non-transitory computer readable storage media storing code, the code being executable by the processor to perform operations comprising:
  - receiving, from a retrieval engine, a plurality of tokens identified as being related to key words from a user's query submitted to an artificial intelligence engine, the tokens indexed to data segments stored by a large language model ("LLM");
  - placing, using a round robin scheduler optimizer, first tokens identified as most relevant to the user's query in a ready queue and placing, using the round robin scheduler optimizer, second tokens identified as less relevant to the user's query in a waiting queue; and
  - using a fully shared data parallel ("FSDP") engine to retrieve first data segments indexed to the first tokens into cache memory proximate to each other and to retrieve second data segments indexed to the second tokens into the cache memory proximate to the first data segments.

11. The apparatus of claim 10, further comprising operations for processing the first data segments and providing a response to the user's query via a user interface.

12. The apparatus of claim 11, wherein the user's query comprises a first user's query, and the operations further comprise:
- receiving a second user's query related to the first user's query;
- identifying one or more of the second tokens as being related to the second user's query;
- determining that the second data segments indexed to the one or more of the second tokens related to the second user's query are stored in the cache memory; and
- processing the second data segments indexed to the one or more of the second tokens related to the second user's query that are stored in cache memory during processing to provide a response to the second user's query.

13. The apparatus of claim 12, wherein identifying the one or more second tokens as being related to the second user's query comprises using a reranking engine.

14. The apparatus of claim 11, wherein the first data segments are distributed in cache memory of a plurality of processors using FSDP and wherein processing the first data segments comprises processing the first data segments in parallel using the plurality of processors.

15. The apparatus of claim 14, wherein the processors comprise graphics processing units ("GPUs").

16. The apparatus of claim 14, wherein the first data segments are processed in parallel along with data segments associated with a plurality of other queries.

17. The apparatus of claim 10, wherein the first data segments and the second data segments are partitioned in fixed size data segments, wherein a size of the partitions of the data segments is selected by a user during a provisioning process.

18. The apparatus of claim 10, wherein the waiting queue comprises a plurality of queues organized by topic and/or key word.

19. A program product comprising a non-transitory computer readable storage medium storing code, the code being configured to be executable by a processor to perform operations comprising:
- receiving, from a retrieval engine, a plurality of tokens identified as being related to key words from a user's query submitted to an artificial intelligence engine, the tokens indexed to data segments stored by a large language model ("LLM");
- placing, using a round robin scheduler optimizer, first tokens identified as most relevant to the user's query in a ready queue and placing, using the round robin scheduler optimizer, second tokens identified as less relevant to the user's query in a waiting queue; and
- using a fully shared data parallel ("FSDP") engine to retrieve first data segments indexed to the first tokens into cache memory proximate to each other and to retrieve second data segments indexed to the second tokens into the cache memory proximate to the first data segments.

20. The program product of claim 19, wherein the user's query comprises a first user's query and further comprising operations for:
- processing the first data segments and providing a response to the first user's query via a user interface;
- receiving a second user's query related to the first user's query;
- identifying one or more of the second tokens as being related to the second user's query;
- determining that the second data segments indexed to the one or more of the second tokens related to the second user's query are stored in the cache memory; and
- processing the second data segments indexed to the one or more of the second tokens related to the second user's query that are stored in cache memory during processing to provide a response to the second user's query.

* * * * *